June 30, 1970 — W. HOLLE — 3,517,992

AUTOMATIC FOCUSING SLIDE PROJECTOR

Filed April 21, 1969 — 5 Sheets-Sheet 1

INVENTOR
Werner Holle

INVENTOR
BY Werner Holle
Krafft & Wells
ATTORNEYS

INVENTOR
BY Werner Holle
Krafft & Wells
ATTORNEYS

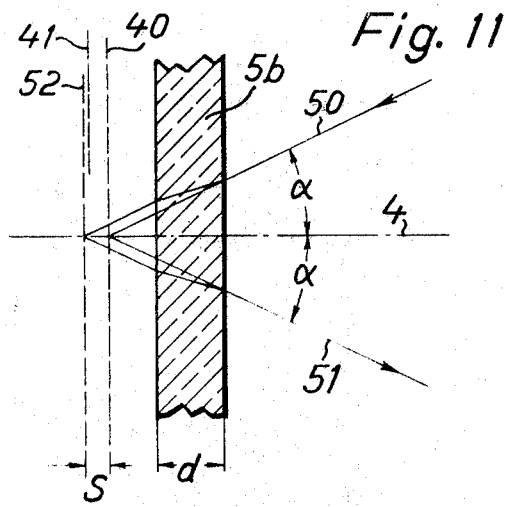
Fig. 11
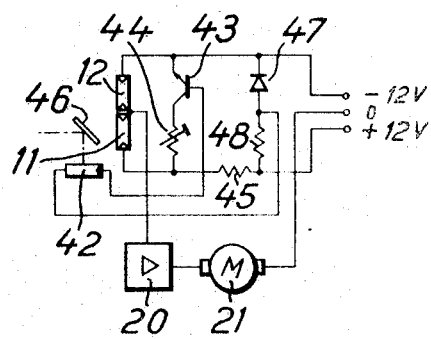
Fig. 12
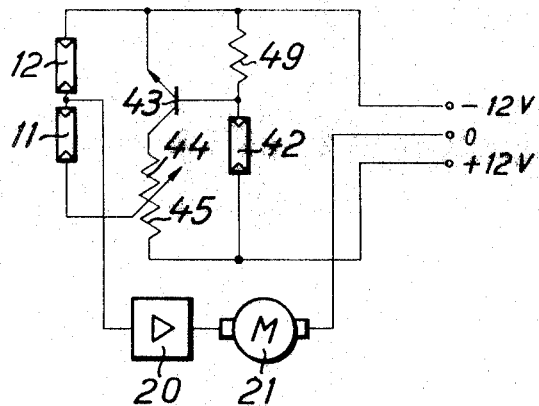
Fig. 13
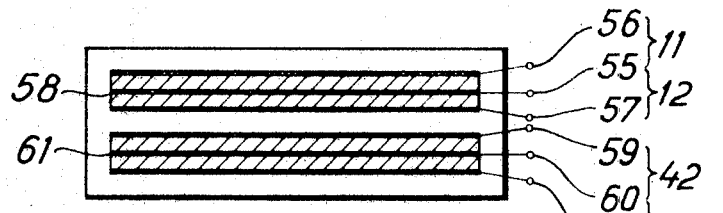
Fig. 14
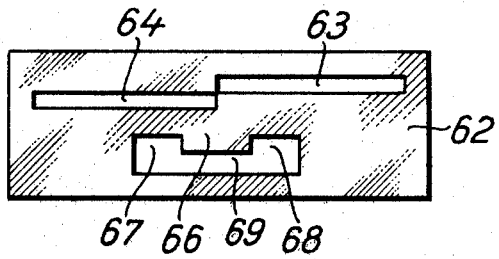

3,517,992
Patented June 30, 1970

3,517,992
AUTOMATIC FOCUSING SLIDE PROJECTOR
Werner Holle, Wetzlar, Germany, assignor to Ernst Leitz G.m.b.H., Wetzlar, Germany
Continuation-in-part of application Ser. No. 680,179, Nov. 2, 1967. This application Apr. 21, 1969, Ser. No. 817,913
Claims priority, application Germany, Apr. 24, 1968, 1,772,276; Aug. 9, 1968, 1,797,070, 1,797,061
Int. Cl. G03b *3/00*
U.S. Cl. 353—101                 15 Claims

ABSTRACT OF THE DISCLOSURE

In a slide projector, means are provided for automatically maintaining a focus distance between the projection lens and the transparency. Said means comprise means adapted to produce an auxiliary light beam, a slit diaphragm, means adapted to project an image of said slit on the transparency and means for guiding those slit image forming beams which are reflected from the transparency and/or from the cover glasses onto two photoelectric transducers. Motive means are arranged, said means having an input controlled by the current from said photoelectric transducers and having an output for controling means adapted to vary the relative distance between the transparency and the projection lens. Light attenuation means are disposed in front of one of said photoelectric transducers whereon primarily those light rays are incident which are reflected by the front cover glass of the transparency. The term front cover glass being used to designate this cover glass onto which the slit image forming rays impinge first on their way from the light source to the transparency and onto the photoelectric transducers. In a further embodiment of the invention the light attenuation means are replaced by a specific design of the electric control circuit.

CROSS-REFERENCE TO RELATED APPLICATIONS

The present application is a continuation-in-part application of my co-pending application Ser. No. 680,179, filed Nov. 2, 1967; and further including features from the applications 1,772,276, filed Apr. 24, 1968; 1,797,070, filed Aug. 9, 1968; 1,797,061, filed Aug. 9, 1968 in the Patent Office of the Federal Republic of Germany, the priority of which first-filed applications is claimed herewith in accordance with 35 U.S.C. 119.

BACKGROUND OF THE INVENTION

The present invention relates to slide projectors comprising means adapted to automatically focus the slides to be projected. More particularly, the invention relates to projectors having an automatic focusing device, the latter comprising a light projecting device for producing a slide sensing light beam and, further, comprising slide positioning means in a control circuit which includes two photoelectric transducers adapted to receive the slide sensing light beam after reflection by the slide.

Automatic focusing slide projectors are well known to those skilled in the art. Amongst the various methods of maintaining a focus distance between the transparencies and the projection lens there is one particularly advantageous method whereby this constant distance is controlled by means of an auxiliary light beam which is projected at an angle to the optical axis onto the transparency and is reflected therefrom to two photoelectric transducers. The two transducers are connected to form a twin transducer and are part of a control circuit which also comprises a reversible motor the output of which is in operative connection with the projector lens or with the slide support means. If both photoelectric transducers are illuminated equally there is no current flowing through the motor windings: the motor is at rest. If, however, light intensity is higher on one transducer than on the other the motor will run and thereby will displace the lens or the slide support means until light intensity is again equal on both transducers. The position of the lens or the slide wherein equal light intensity on both transducers is achieved corresponds to the proper distance between the projection lens and the transparency, i.e. the focus position of the slide.

Devices of this type work satisfactorily if slides are used which do not have cover glasses, for example transparencies mounted in simple cardboard frames. With these kinds of slides only one image of the slit is reflected from the slide to the photoelectric transducers, producing a well defined distribution of light intensity on said transducers. However, the devices do not work so well, when the transparency mounts comprise cover glasses in front and behind each transparency.

From the glass mounted slides a plurality of slit images is reflected to the photoelectric transducers. Altogether at least five reflected images are projected on the transducers; each image being different in intensity from the other images. The first and brightest image is reflected from the front surface of the front cover glass (here and throughout the specification the term "front cover glass" is used to denote the cover glass whereon the slide sensing light beam impinges), the second and only slightly less bright image results from the rear surface of the front cover glass, the third image is caused by the transparency itself and the fourth and fifth images are reflected from the front and rear surface of the cover glass behind the transparency. The brightness of all these images is different and particularly the brightness of the third, fourth and fifth image varies, depending on the density of the transparency.

If, for example, a transparency of high density is to be projected the third image will be rather bright and will in effect be only little less bright than the slit images reflected from the front and rear surface of the front cover glass. The images reflected from the two surfaces of the rear cover glass will in this case, of course, be only very faint. If, however, the slide is very transparent the fourth and fifth image will be brighter, but will still be considerably less bright than the first and second image.

Having this in mind it will be readily understood that whenever in cardboard frames mounted slides and slides mounted between cover glasses are to be projected in intermixed order the focusing device will work accurately with the cardboard frame mounted slides, but will fail to do so with the glass mounted slides. Owing to the rather bright first, second and third reflected images and the rather faint fourth and fifth images the device will bring a plane into focus which is located somewhere between the front surface of the front cover glass and the transparency instead of bringing the transparency itself into focus.

SUMMARY OF THE INVENTION

It is an object of the present invention to provide an automatic focusing projector which functions equally satisfactorily both with transparencies mounted in cardboard frames and transparencies mounted between cover glasses.

The intensity of the reflexes caused by the front and rear cover glass of a glass mounted slide are unsymmetrical compared to the reflex caused by the transparency itself. However, the cover glasses do not only change the intensity of the reflexes, they also cause an increase of the optical distance between transparency and projection lens. In order to again focus the slide properly the distance between slide and projection lens must be increased accordingly.

It is, therefore, a further object to provide an automatic focussing device by which this increase in distance is accurately accomplished.

These objects are attained by reducing the effect on the position control device of this one photoelectric transducer on which impinges the reflex from the front cover glass when the glass mounted slide is properly focused. Reduction of the effect of the photoelectric transducer can either be accomplished by disposing a light attenuation means such as a filter or a mask in front of the transducer or by deliberately biasing the electric control circuit. Further, an electric means can be associated with the transducer which causes the motor to run whenever no light impinges on both photoelectric transducers. The electric means (resistance) is designed so that the motor which is controlled by the position control circuit just still responds safely when no light impinges on the transducers.

The device projecting the slide sensing light beam and photoelectric transducers are arranged in acute angles relative to the slide on both sides of the projection lens so that the device and the transducers are still outside of the slide imaging light rays.

Further, the ratio of the effect of one transducer to the effect of the other transducer is made different with a cardboard mounted slide and with a glass mounted slide. For projecting a cardboard mounted slide the effect of both transducers is made equal. For projecting a glass mounted slide, however, the effect is tuned off in such a manner that the transparency is displaced to a position where it is in focus when the increase of the optical path caused by the glass is taken into account.

DESCRIPTION OF THE DRAWINGS

The invention will be more readily understood from the following description when taken in conjunction with the accompanying drawings, wherein

FIG. 11 shows schematically the increase in the optical distance caused by the glass plate, FIGS. 12, 13 show two further embodiments of a position controlling device, FIG. 14 is a schematic drawing of two photoelectric transducing and a mask element.

Figure 1:
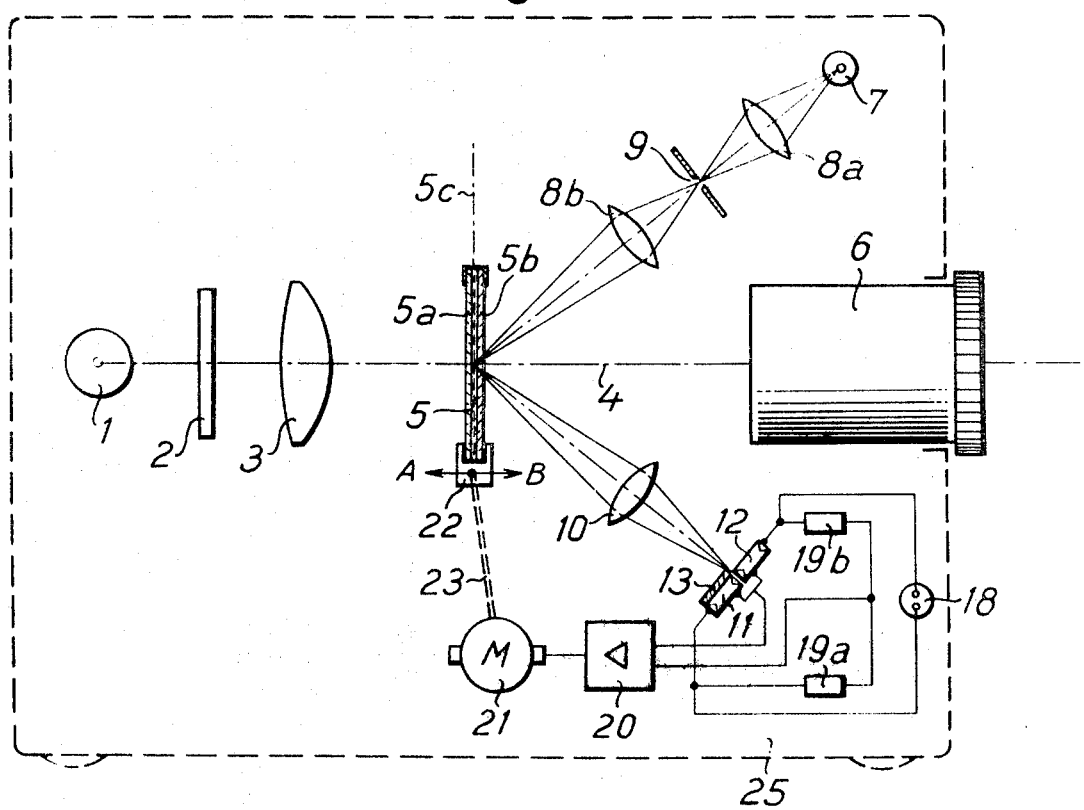
FIG. 1 shows schematically the elements of the invention applied to a projector wherein the proper focus distance between slide and projection lens is maintained by displacing the slide guide along the optical axis and wherein the photoelectric transducers consist of photoelectric resistors connected in a bridge circuit.

Referring now to the drawings and more particularly to FIG. 1 the projector comprises a light bulb 1 and a projection lens 6 between which the optical axis 4 is defined. A heat-absorbing filter 2 and a condensing lens 3 are arranged along the optical axis. A slide 5 is supported by a slide guide 22, the latter being in driving connection with motor 21 and being displaceable by said motor along the optical axis in the direction of the arrows A and B. By the light beams emitted by light bulb 1 and by means of the lens 6 an image of the transparency of slide 5 is projected on a suitable screen (not shown) in a manner known per se.

For automatic adjustment of slide 5 to focus distance relative to lens 6, a control device is provided comprising an illumination system the axis of which is inclined to the optical axis 4. The illumination system consists of the light bulb 7, two field lenses 8a, 8b and a slit diaphragm 9 disposed between said lenses. An image of the slit is projected into the focal plane 5c where the slide 5 is approximately positioned.

Figure 3:
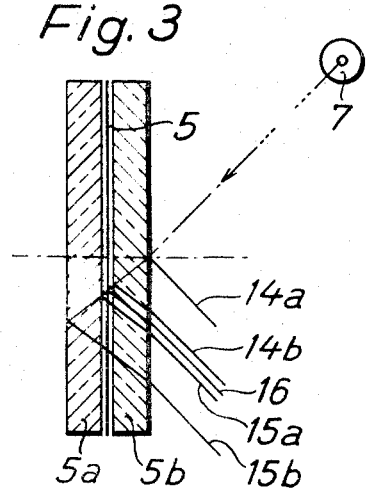
FIG. 3 shows the reflection of the slit image forming light beams from the slide.

Slide 5 is shown to be a glass mounted slide with the cover glass 5a being the rear glass plate and cover glass 5b being the front glass plate between which the transparency is sandwiched. By the light beams emitted by bulb 7 and by means of lens 8b an image of slit 9 is projected in the focal plane, i.e. on slide 5. The light rays are partially reflected by slide 5 in a manner depicted in FIG. 3. Instead of only one slit image being reflected from the slide as will be the case with non-cover glass mounted slides, there are five reflected images, however of different intensity. The two images formed by the beams 15a, 15b which are reflected from the two surfaces of the rear cover glass 5a are faintest. On the other hand, the two images formed by the beams 14a, 14b which are reflected from the two surfaces of the front cover glass are brightest, and the brightness of the image formed by the beam which is reflected from the transparency itself is of average intensity.

Figure 2:
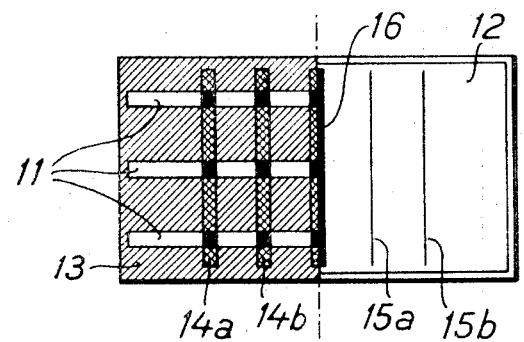
FIG. 2 shows a light attenuation means in front of a photoelectric resistor.

These images are reflected to the photoelectric transducers 11, 12 which are arranged adjacent each other in the image plane of lens 10. In front of transducer 11 on which—after image inversion by lens 10—the bright light beams 14a, 14b are incident there is disposed a light attenuation means 13 adapted to reduce the intensity of said beams to the average level of the intensity of beams 15a, 15b. As such light attenuation means 13 may be used, for example, a neutral filter as illustrated by FIG. 1 or a slit diaphragm as shown in FIG. 2.

In automatic focusing devices having two photoelectric resistors in a D.C. bridge circuit as shown in FIG. 1 the optically effective light attenuation means can be dispensed with if one of the other two resistors 19a, 19b in the bridge circuit is designed as to deliberately bias said circuit according to the average difference of light intensity on said two resistors. If to this end a variable resistor is employed it will even be possible to adjust the bridge circuit bias to various transparency densities. The diagonal branch of the bridge circuit is connected to the zero amplifier 20 the output of which feeds the reversible motor 21. By means of suitable linking elements 23 motor 21 is in driving connection with slide guide 22.

The above described device functions as follows: First be it assumed that slide 5 is not yet positioned in the focal plane of lens 6. This results in the images reflected from the slide's various surfaces being projected on the two photoelectric transducers 11, 12 with a certain lateral displacement. The distribution of light intensity on both transducers is thus not uniform which causes motor 21 to start and move slide guide 22 and slide 5 along the optical axis either towards lens 6 or in opposite direction until the light intensity on the transducers becomes equal. This will occur when—as shown in FIG. 2—the remaining bright image formed by beam 16 is positioned on the adjacent edges of the transducers 11, 12. The other two bright images formed by beams 14a, 14b have been reduced in intensity to the intensity of beams 15a, 15b. Thus, the images formed by beams 15a, 15b and 14a, 14b are balanced in intensity which results in the image formed by beam 16 remaining the only one effective with regard to the focusing operation. Motor 21 will therefore run until the image formed by beam 16 is equally placed on both transducers 11, 12, which means that the image covers the adjacent edges of said transducers. This condition, however, is only achieved if the transparency is positioned in the focal plane of projection lens 6.

If the images produced by the light beams 15a, 15b are of different, i.e. of higher or lower intensity than the images produced by the attenuated beams 14a and 14b, or if the images produced by the light beams 15a, 15b are altogether negligible a minor misadiustment is achieved. This results from the fact that this part of the slit image formed by light beam 16 which is incident on the unattenuated transducer 12 becomes more or less wide. This misadjustment, however, lies well within the range of depth of field.

With slides having no cover glasses the only slit image will also be placed slightly unsymmetrically on the transducers since the transducers have been made to differ in effect. However, this dissymmetry also remains within the range of depth of filed if the width of slit 9 is chosen sufficiently narrow. In FIG. 2 the slit images are depicted extremely narrow for sake of clarity.

Figure 4:
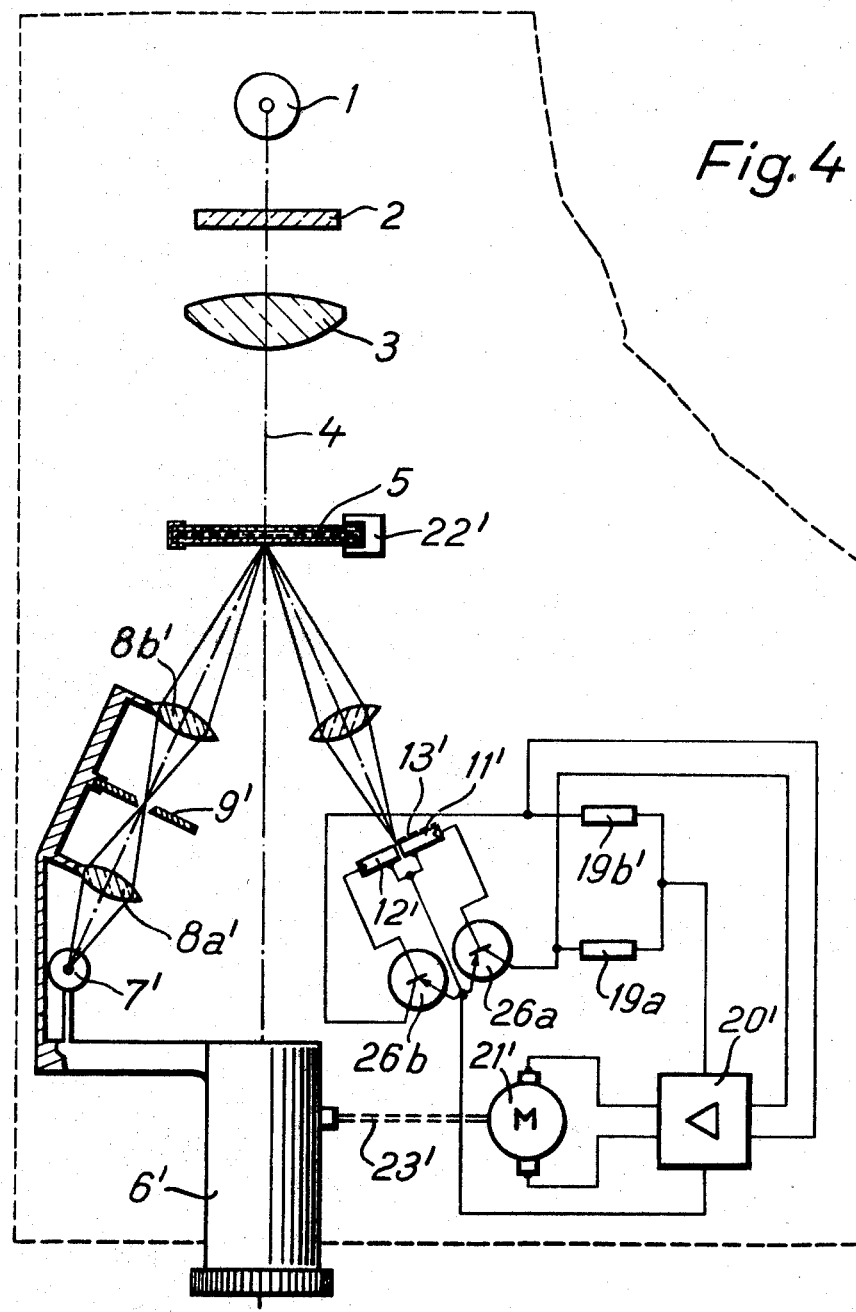
FIG. 4 shows schematically the elements of the invention applied to a projector wherein the proper distance between slide and projection lens is maintained by displacing the projection lens along the optical axis and wherein the photoelectric transducers consist of photoelectrci cells or elements.

In FIG. 4 the projector comprises the same light bulb 1, heat-absorbing filter 2, condensing lens 3 and slide 5 to which reference has already been made in connection with FIG. 1. However, while in the embodiment illustrated in FIG. 1 the projection lens 6 is stationary and the slide guide means 22 are movable along the optical axis for focusing purposes, this situation is reveresd in the embodiment shown in FIG. 4. The slide guide means 22' is kept stationary—except for a slide changing movement perpendicular to the optical axis, which movement, however, is not discussed in this connection—and the projection lens 6' is displaceable along the optical axis 4.

This calls for a slightly different construction insofar as the slit illumination system consisting of the light bulb 7', the field lenses 8a', 8b' and the slit diaphragm 9' has to be rigidly connected to the projection lens 6' in a manner known per se.

In variation of the embodiment of FIG. 1, wherein photoelectric transducers 11, 12 are employed in a bridge circuit, in the embodiment of FIG. 4 photoelectric transducers 11', 12' are used for measuring the light intensity of the various reflected slit images. Said photoelectric transducers 11', 12' are connected to a differential amplifier 20' by means of two transistors 26a, 26b and two ohmic resistors 19a', 19b'. The output of amplifier 20' is in connection with motor 21' which in turn is drivingly connected to the projection lens 6' by linking elements 23'.

The photoelectric transducers 11', 12', the transistors 26a, 26b, the resistors 19a', 19b' and the amplifier 20' together form an electric differential system which causes the reversible motor 21' to run, whenever the light intensity on one photoelectric cell is different from the intensity on the other cell, thereby displacing lens 6' along the optical axis in one direction or the other until light intensity on both cells is again balanced.

In front of transducer 11' is disposed the light attenuation means, for example the slit diaphragm 13'. However, as has been already disclosed with reference to the embodiment of FIG. 1 the light attenuation means can be dispensed with if the ohmic resistors 19a', 19b' are especially designed to be of a particular pre-established ratio.

Referring now to the embodiments as illustrated in the FIGS. 5 through 10, wherein elements already described in connection with FIGS. 1 through 4 are denoted by like numerals there is a resistance 24 (FIG. 5) connected in parallel to the transducer 11 of the twin transducer 11, 12, which resistance operates as a voltage divider for amplifier 20.

The light attenuation means 13 in front of transducer 11 is a diaphragm which is designed so that the height H of the light receiving surface A (FIG. 6) corresponds to transducer 12 while width B corresponds to half the width of image S of the slit when projected in the plane of the transducer surface. From FIGS. 7 and 8 the reason for designing the diaphragm in this particular manner will be apparent. The various slit images are depicted separately in front of the transducers 11, 12 with the intensity of each image being marked by different hatching. Further, the reflecting surfaces of the slide are shown schematically in order to facilitate understanding. However, actually the position of the reflecting surface is laterally reversed on account of the image reversal of the imaging lens. The slit image 14a being reflected by the front surface of the front cover glass is relatively bright. Almost equally bright are the slit images 14b and 16 which are respectively reflected by the rear surface of the front cover glass and by the transparency. Contrary thereto the two slit images 15a, 15b being reflected by the front and rear surface of the rear cover glass are only of minor intensity. The reflected slit images form the light intensity curve 28 if a transparency of low density is projected, this curve having a peak 29 which corresponds roughly to the rear plane of the front cover glass 5b. This alone is enough to make apparent that by a control device employing a twin photoelectric transducer of which the individual transducers have an equal effect no positioning of the slide to the plane of the transparency can be achieved. By the diaphragm (light attenuation means 13) the effective surface of the transducer 11, whereon the image of the highest intensity impinges, is greatly reduced, as a consequence whereof the slide is positioned to the middle of image 16 which is reflected from the transparency 5. The graph shows that the light intensity on the transducer 11, represented by the area 30, is thus made about equal to the light intensity on the transducer 12 as represented by the area 31.

Figure 8:
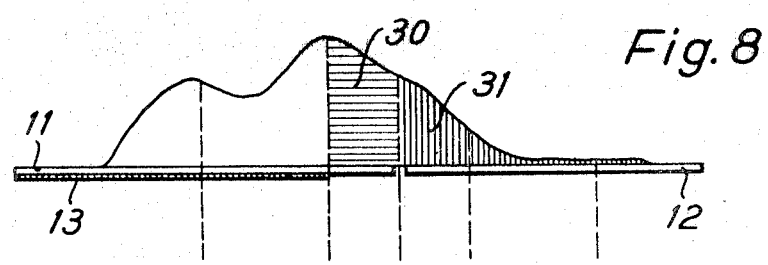
FIG. 8 is a diagram similar to the diagram of FIG. 7, the slide including a high-density transparency.
Figure 9:
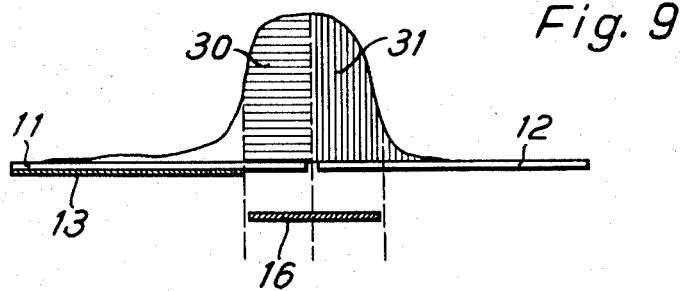
FIG. 9 is a diagram of the intensity of the light reflected from a cardboard mounted slide.

This is also the case in the examples illustrated in FIGS. 8 and 9. Here again the two areas 30, 31 are associated with one transducer each, even if only one slit image is reflected from a cardboard mounted transparency. Reduction of the receiving surface of one transducer results in a proper slide positioning to the plane of the transparency, regardless whether a glass mounted or cardboard mounted slide is projected.

The resistance 24 serves to drive motor 21 when no light impinges on the twin transducer 11, 12, in order to perform a search motion. Motor 21 then runs until proper balance of the circuit is achieved in the above described manner. To this end, the resistance is on the one hand small enough for the amplifier to produce a control current for motor 21, on the other hand, however, the resistance is great enough to allow for a proper balance of the bridge circuit.

Figure 10:
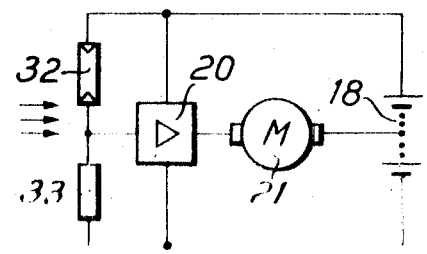
FIG. 10 is an electric control circuit wherein only one photoelectric transducer is employed.

The embodiment illustrated in FIG. 10 comprises only one photoelectric transducer 32. Here, the resistor 33 helps to achieve the balance in the circuit, the latter being tuned so that balance is achieved when the transducer 32 receives a light intensity as shown by area 31. This embodiment, however, is less efficient than the above described, since the accuracy of the positioning is effected by variations both in the brightness of bulb 7 and in the density of the transparency.

Returning now to FIG 5 an image of slide 5 is by means of projection lens 6 projected on a screen (not shown). If the screen and the projection lens 6 are stationarily arranged one particular plane of sharpness 40 (FIG. 11) is defined by them wherein a non-glass mounted transparency must be disposed in order to be imaged sharply.

In the event of the transparency being glass mounted between the cover glasses 5a, 5b an increase of the optical distance is caused by the glass which amounts to 34% of the thickness of the cover glass when the latter has a refractive index $n=1.52$. Let it now be assumed that the thickness of the glass is 1 mm. In order to be imaged sharply a glass mounted transparency must therefore be displaced by 0.34 mm. from plane 40 to the left in the drawing into a plane 41. It will be thus readily understood that for glass mounted slides and non-glass mounted slides two different planes of sharpness are existent. It is the object of the focusing device (or positioning device) to be described hereinafter to position slides of each type (glass mounted and non-glass mounted) as accurately as possible in their respective plane of sharpness.

The focusing device comprises a projection device 7, 8a, 8b, 9 (FIG. 5) the optical axis of which is denoted by numeral 50. Further, there is provided a photoelectric transducer system 10, 11, 12, 13 having an optical axis 51. The axes 50, 51 are arranged so as to subtend an angle $\alpha$ with a reference axis which extends normal to the slied 5. (In the drawing the reference axis is shown to coincide with the optical axis 4 of the slide imaging light beam. In actual practice however, both axes differ from one another.)

By introducing the front cover glass 5b into the projector the optical path of the focusing projection device is increased and the sensing light beam (the beam that coincides with axis 50) is refracted in the direction of the axis of incidence, as a consequence whereof this beam intersects the reference axis in a plane 52, after having previously left the cover glass 5b (FIG. 11). In the event of the transparency being disposed in this plane 52 the reflected light beam will coincide with the axis 51 of the photoelectric transducer device after having again left the cover glass 5b, just like this reflected light beam would coincide with the axis 51 if a non-glass mounted transparency would be disposed in plane 40. The focusing device will therefore displace the glass mounted slide 5 laterally so that the transparency is arranged in plane 52, the latter being spaced from plane 40 by a distance $$S = d\left(1 - \frac{\tan\left[\arcsin\left(\frac{\sin\alpha}{n}\right)\right]}{\tan\alpha}\right)$$

wherein $d$ is the thickness of the front cover glass and $n$ is the refractive index of the glass.

Distance S equals the distance between the planes 40 and 41 when $\alpha$ becomes zero. With small angles $\alpha$ S increases slowly, however, with greater angles $\alpha$ S increases more rapidly. Angle $\alpha$ is therefore chosen as small as possible, just large enough for the projection device 7–9 and the transducer device not to shield the slide imaging light beam. Preferably, angle $\alpha$ is made 15°–30°. If $\alpha$ is, for example, 25°, then the distance S has increased only from 34% to 38% of the thickness of the cover glass and the distance of the planes 41 and 52 is only 0.04 mm. if the cover glass is 1 mm. thick. In known projectors the angle $\alpha$ has hitherto been made to be 45°, as a consequence whereof the distance S is 0.13 mm.

The above described phenomenon (difference between the planes 41 and 52) is, of course, also present with projectors wherein the photoelectric transducers device comprises only one transducer or a plurality of transducers instead of a twin transducer as herein described. The invented features can therefore also be employed with projectors having other than twin transducers.

Figure 5:
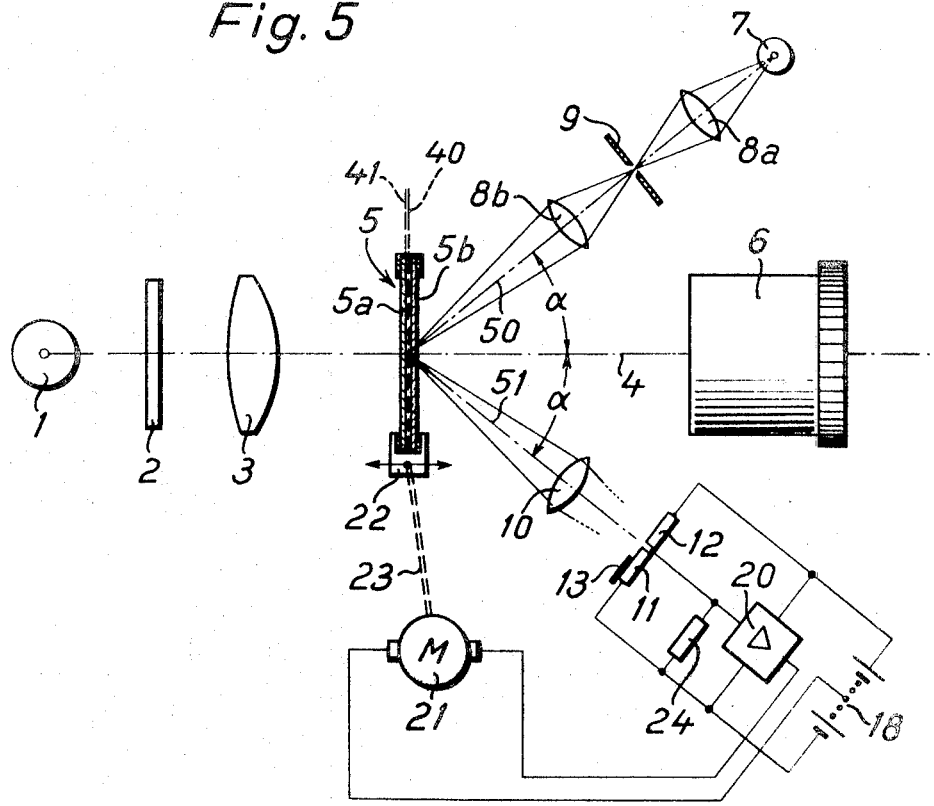
FIG. 5 shows schematically a further embodiment of the invention.
Figure 6:
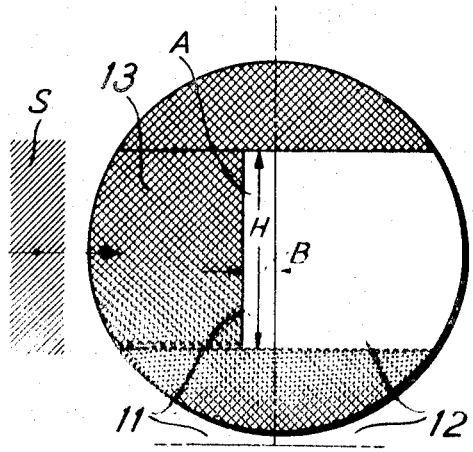
FIG. 6 is a plan view of the two photoelectric transducers combined to form a twin transducer.

If the angle $\alpha$ cannot be chosen sufficiently small the electric circuits now described with reference to the FIGS. 12, 13 and 14 can be employed, which circuits then replace the circuits illustrated in the FIGS. 1, 4 or 5. The circuits shown in FIGS 12, 13, 14 are also designed to focus automatically glass mounted and non-glass mounted slides in intermixed sequence.

The device shown in FIG. 12 comprises the twin photoelectric transducer 11, 12 which is connected in the circuit as a voltage divider and to which the amplifier 20 is connected, which amplifier controls the motor 21. Further, there are incorporated an auxiliary transducer 42, an auxiliary mirror 46, and a transistor 43 which form an auxiliary voltage divider, together with the resistances 44, 45. A device 47, 48 serves to adjust the working point of transistor 43 which is controlled by the auxiliary photoelectric transducer 42. Mirror 46 is semi-transparent and is arranged sufficiently far to one side of twin transducer 11, 12 that a reflex emanating from a non-glass mounted slide 5 disposed in plane 40 is just not shielded. The edge of mirror 46 is therefore disposed off the axis 51 by at least one half of the slit image width as is readily apparent from FIG. 12.

Figure 7:
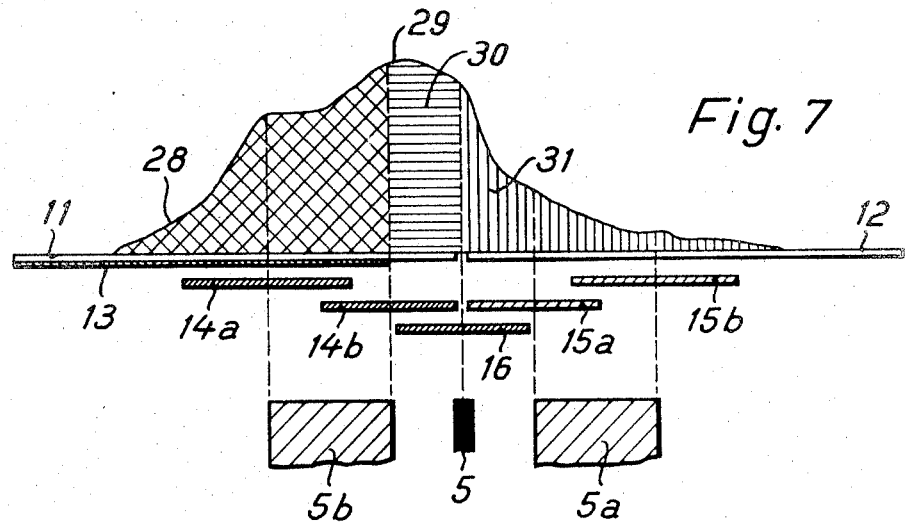
FIG. 7 is a diagram of the intensity of the light reflected from the glass mounted slide which includes a transparency of low density.

If a glass mounted slide is introduced into the projector there occurs an irregular distribution of the reflex intensities from the cover glasses 5a, 5b compared to the reflex from the transparency, as has been described with reference to FIGS. 7–9. This irregularity of the reflex intensities causes the slide 5 to be displaced too far to the left (in the drawing). Due to the cover glasses the optical paths both of the slide imaging light beams and the position sensing light beam of the focusing device are increased, this increase, however, being different in length owing to the fact that the light sensing beam and the reflected beam impinge obliquely by the angle $\alpha$, as has been described before. The transducer device senses the reflected image too far to the left (FIG. 11) compared to plane 41, so that—if the reflex from the front cover glass would be attenuated in intensity to the intensity of the reflex from the rear cover glass—the focusing device would place the slide guide 22 in the plane 52 in FIG. 11, which is also too far to the left. However, a portion of the reflexes 14a, 14b from the front cover glass 5b (FIG. 7) is reflected by auxiliary mirror 46 to the auxiliary transducer which causes a tuning-off of the circuitry of the twin transducer 11, 12. The extent of the tuning is empirically adjusted in such a way that the attenuating influence on transducer 12 (being associated to the front cover glass 5b) exceeds the tuning-off which occurs during the reception of reflexes of equal intensity 14a, 14b and 15a, 15b. The extent of the tuning-off is obtained empirically for a transparency having an average density so that a glass mounted slide is positioned in the plane of sharpness 41.

The illustrated circuitry functions as follows: Upon reception of sufficiently intense reflexes on the auxiliary transducer 42, transistor 43 will become conductive as a consequence whereof the potential between resistors 45 and 44 will decrease. This causes the voltage divider consisting of the twin transducer 11, 12 to be tuned-off. As a result the amplifier 20 controls motor 21 in such a way that the reflex emanating from the transparency impinges between the two transducers 11, 12. If a non-glass mounted slide is inserted in the slide guide no light will be reflected to the auxiliary transducer 42 and thus no tuning-off will occur at all, or, if a tuning-off occurs it will be of such an extent that it differs greatly from the tuning-off which results from a glass mounted slide. The two different extents of a tuning-off are established in such a way that a non-glass mounted slide is positioned in plane 40 and a glass mounted slide in plane 41.

Instead of the circuitry illustrated in FIG. 12 there can be employed the circuitry shown in FIG. 13. In this circuit the auxiliary transducer 42 is in series connection with a further resistor 49. Advantageously, the transducer types 11, 12, 42 shown in FIG. 14 are used. As can be seen from FIG. 14 the transducers 11, 12 are provided with electrodes 55 to 57. In known manner the electrodes are covered by a CdS-layer 58. Electrode 56 is screened by a mask 62 (on the left side of the figure) and receives light through a slit 63 in mask 62. As a result electrode 56 is only effective with regard to transducer 11. In similar manner electrode 57 is made to be effective only with regard to transducer 12 by means of a slit 64 in mask 62. The auxiliary transducer 42 comprises also electrodes 59, 60 and 65 which are also covered by a CdS-layer 61. Mask 62 screens electrode 59 in the area 66, in the drawing underneath of the edge separating the transducers 11, 12. Area 6 is placed somewhat unsymmetrical relative to the separating edge and is large enough for the reflex of a positioned non-glass mounted slide (after search motion) to impinge on this area, as a consequence whereof the auxiliary transducer 42 remains ineffective no matter how great the occurring tuning-off in the circuit of the transducers 11, 12 is. The area 66 is of a width which is about equal or slightly wider than the width of the slit image. Besides the area 66 there are provided slits 67 and 68 and a portion of the reflexes from a glass mounted slide impinges in any case through these slits, which results in the auxiliary transducer being made effective. Further, the mask 62 is provided with another slit 69 which leaves electrode 65 uncovered so that a second auxiliary transducer 42a is formed, comprising the electrodes 60, 65. This second auxiliary transducer can be employed in the circuit for compensation purposes, e.g. for compensation of variations in light source brightness.

The circuit illustrated in FIG. 13 functions similar to the circuit shown in FIG. 12. If auxiliary transducer 42 receives sufficient light transistor 43 becomes conductive which causes the auxiliary voltage divider 44, 45 to be tuned-off. If a non-glass mounted slide is introduced in slide guide 22 the auxiliary transducer will receive no light and thus no tuning-off will occur.

It is also possible to place auxiliary mirror 46 (FIG. 12) across the whole width of the transducers 11, 12. In this case a mask is employed in front of auxiliary transducer 42 which is similar to the mask 62 in the area 66.

What is claimed is:

1. An automatic focusing slide projector for transparencies having glass covers intermixed with transparencies without glass covers comprising:
   a light source (1) adapted to provide light beams for projecting image of a transparency (5) on a screen;
   a projection lens (6);
   slide guide means (22) for supporting a slide in the path of said light beams;
   means (23) adapted to vary the distance between said projection lens (6) and said slide;
   means (7, 8a, 8b) adapted to project the image of a slit (9) on the slide;
   two photoelectric transducers (11, 12), said transducers connected in an electric differential circuit the output of which controls said distance variation means (23);
   means (10) adapted to guide the light beam reflected by the surface of a transparency and the light beams of different intensities reflected by the surfaces of glass covers, if present, of a slide to said two photoelectric transducers, thereby projecting an image or images of said slit on the surfaces of said photoelectric transducers;
   an amplifier (20) connected to the output of said electric differential circuit;
   a reversible motor (21) being connected to said amplifier (20), said motor providing the motive force for said distance variation means (23); and means for reducing the effect of one transducer corresponding to the difference in the intensities of beams reflected from said surfaces of said glass covers.

2. An automatic focusing slide projector for transparencies having glass covers intermixed with transparencies without glass covers comprising;
   a light source (1) adapted to provide light beams for projecting the image of a transparency (5) on a screen;
   a projection lens (6);
   slide guide means (22) for supporting a slide in the path of said light beams;
   means (23) adapted to vary the distance between said projection lens (6) and said slide;
   means (7, 8a, 8b) adapted to project the image of a slit (9) on the slide; two photoelectric transducers (11, 12), said transducers being connected in an electric differential circuit the output of which controls said distance variation means (23);
   means (10) adapted to guide the light beam reflected by the surface of a transparency and the light beams of different intensities reflected by the surface of glass covers, if present, of a slide to said two photoelectric transducers, thereby projecting an image or images of said slit on the surfaces of said photoelectric transducers;
   a reversible motor (21), said motor being the motive means of said distance variation means (23); and
   means for changing the ratio of the effect of one transducer to the other transducer corresponding to the difference in the intensities of beams reflected from said surface of said glass covers.

3. An automatic focusing slide projector for transparencies having glass covers intermixed with transparencies without glass covers comprising:
   a light source (1) adapted to provide light beams for projecting the image of a transparency (5) on a screen;
   a projection lens (6);
   slide guide means (22) for supporting a slide in the path of said light beams;
   means (23) adapted to vary the distance between said projection lens (6) and said slide;
   means (7, 8a, 8b) adapted to project the image of a slit (9) on the slide;
   a photoelectric transducer (32) and a biasing means (33), said transducer and biasing means connected in an electric differential circuit, the output of which controls said distance variation means (23);
   means (10) adapted to guide the light beam reflected by the surface of a transparency and the light beams of different intensities reflected by the surfaces of glass covers, if present, of a slide to said photoelectric transducer, thereby projecting an image or images of said slit on the surface of said photoelectric transducer;
   an amplifier (20) being connected to the output of said electric differential circuit;
   a reversible motor (21) being connected to said amplifier (20), said motor providing the motive force for said distance variation means (23); and
   said biasing means (33) tuned according to the effect of the transducer when receiving a portion of the reflected light.

4. An automatic focusing slide projector according to claim 2, wherein said electric differential circuit includes auxiliary control means for changing the ratio of the effect of the two transducers.

5. An automatic focusing slide projector according to claim 4, wherein said auxiliary control means comprises an auxiliary transducer.

6. An automatic focusing slide projector according to claim 5, further comprising means for illuminating said auxiliary transducer by rays reflected from glass mounted slides and for discontinuing the illumination of said auxiliary transducer by rays reflected from cardboard mounted slides.

7. An automatic focusing slide projector according to claim 1, wherein said means for reducing the effect comprises light attenuation means disposed in front of the surface of the photoelectric transducer (11) on which primarily those light beams are incident which are reflected from the front and rear surfaces of a slide front cover glass (5b), said light attenuation means being adapted to reduce the intensity of the slit images reflected from said front and rear surfaces of said slide front cover glass (5b).

8. An automatic focusing slide projector according to claim 7, wherein said light attenuation means consists of a neutral filter.

9. An automatic focusing slide projector according to claim 7, wherein said light attenuation means consists of a slit diaphragm (13, 13').

10. An automatic focusing slide projector according to claim 7, wherein said reduction is obtained by the shape and size of said attenuation means.

11. An automatic focusing slide projector according to claim 1, and further comprising biasing means associated with the first (11) of the two photoelectric transducers whereon the reflection from the front cover glass impinges, said means being adapted to drive said motor (21) when no light is incident on said two photoelectric transducers (11, 12).

12. An automatic focusing slide projector according to claim 11, wherein said biasing means is a resistor (24) connected in parallel to said first photoelectric transducer (11).

13. An automatic focusing slide projector according to claim 2, wherein said slit image projecting means and said means adapted to guide said reflected light beams to said two photoelectric transducers subtend an acute angle which includes the projection lens and leaves both said slit image projecting means and said guide means outside of the slide imaging beam of light rays.

14. An automatic focusing slide projector according to claim 13, wherein both said slit image projecting means and said reflected light guide means include an angle ($\alpha$) of 15° to 30° with said optical axis (4).

15. An automatic focusing slide projector according to claim 14, wherein said angle ($\alpha$) is 25°.

References Cited

UNITED STATES PATENTS

| | | |
|---|---|---|
| 3,120,779 | 2/1964 | Mulch et al. |
| 3,249,006 | 5/1966 | Stauffer. |
| 3,342,102 | 9/1967 | Maxon. |

FOREIGN PATENTS

| | | |
|---|---|---|
| 28,184 | 4/1964 | Germany. |

SAMUEL S. MATTHEWS, Primary Examiner